United States Patent [19]

Tangorra

[11] Patent Number: 4,661,088
[45] Date of Patent: Apr. 28, 1987

[54] BELT FOR THE TRANSMISSION OF MOTION BETWEEN PULLEYS

[75] Inventor: Giorgio Tangorra, Monza, Italy

[73] Assignee: Industrie Pirelli, S.p.A., Milan, Italy

[21] Appl. No.: 787,095

[22] Filed: Oct. 15, 1985

[30] Foreign Application Priority Data

Oct. 15, 1984 [IT] Italy .............................. 23150 A/84

[51] Int. Cl.$^4$ ........................... F16G 1/06; F16G 1/28
[52] U.S. Cl. ..................................... 474/237; 474/252
[58] Field of Search ............... 474/237, 247, 249, 252, 474/238

[56] References Cited

U.S. PATENT DOCUMENTS

| | | | |
|---|---|---|---|
| 2,728,239 | 12/1955 | Adams, Jr. ...................... | 474/238 X |
| 2,776,746 | 1/1957 | Envoldsen ...................... | 474/252 X |
| 3,839,116 | 10/1974 | Thomas et al. ................. | 474/252 X |
| 4,330,287 | 5/1982 | Fischer ........................... | 474/252 X |

Primary Examiner—James A. Leppink
Assistant Examiner—Thuy M. Bui
Attorney, Agent, or Firm—Stevens, Davis, Miller & Mosher

[57] ABSTRACT

Belt (1) of flexible polymeric material, in particular an elastomeric material, for the transmission of motion between two pulleys (6), comprising at least one longitudinal slot (2) defined by a bottom (3) and two lateral walls (4, 5). The belt passes from a first position in which the walls (4, 5) of the slot (2) are at a certain distance from the opposite lateral surfaces of the pulley, to a successive position during the winding of the belt around the pulleys, whereby the pull exercised on the inextensible reinforcing elements (7) of the belt leads to the approach of the slot walls to the opposite lateral surfaces of the pulley (6), resulting in the transmission of motion through friction.

10 Claims, 18 Drawing Figures

BELT FOR THE TRANSMISSION OF MOTION BETWEEN PULLEYS

DESCRIPTION

The present invention is directed to a belt and to its relative transmission of motion in co-action with two pulleys, and more particularly to a belt of flexible polymeric material, in particular elastomeric material, where the transmission of motion with the pulleys takes place through friction.

Belts in which the transmission of power takes place through friction between the belt and the pulleys of the transmission are already known.

More generally, said belts can be in the form of flat belts which wind on smooth cylindrical pulleys or in the form of V-belts whose flanks are wedged into the corresponding V-shaped grooves of the pulleys.

Both these types of belt are used in various fields, but they can produce, in some cases, excessive energy losses or efficiencies limited by the forces of friction.

In particular, in flat belts it is possible to have excessive sliding phenomena between the belt and the pulleys, and those drawbacks can only be overcome by having recourse to at least one pulley having relatively large dimensions.

Transmission of motion with V-belts sometimes produces an insufficient transverse rigidity when the flanks of the belt are subjected to compressive stresses in contact with the grooves of the V-pulleys.

In the V-belt, it is often not possible to define and use a satisfactory arrangement having a sufficient transverse rigidity, since the reinforcing structures inserted into the belt body for this purpose can produce an undesired longitudinal stiffening of the belt, and consequently said belt is not well adapted to pulleys with small radii of curvature.

During experimental tests, applicants have attempted to solve all the problems connected with the art of transmission of motion through friction, and therefore the object of the present invention is to provide a belt and its relative transmission adapted to give an improved fatigue resistance and a high flexibility of the belt, and also such as to improve not only the part of the transmission relating to the belt, but also that part relating to the pulleys, while avoiding at the same time all the drawbacks of previous attempts to solve these problems.

The objects of the present invention are achieved by a belt substantially made of a flexible polymeric material for the transmission of motion with at least two pulleys, said belt comprising a plurality of resistant inserts disposed on a ring concentric with the belt oriented according to the longitudinal direction of the belt, said belt being further characterized in comprising at least one longitudinal slot disposed according to the direction of maximum development of the belt delimited by a bottom and by two walls and a hinged zone in correspondence with the slot, said belt passing from a first position wherein the slot walls are at a certain distance from the opposite or adjacent lateral surfaces of each pulley and a successive position during winding of the belt around the pulleys, whereby the pulling action exercised on the inextensible elements leads to the approach of the slot walls to the opposite lateral surfaces of the pulleys with the resulting desired transmission of motion through friction.

The present invention will be still better understood by the following detailed description made by way of non-limiting example with reference to the attached sheets of drawing, in which.

Figure 1A:
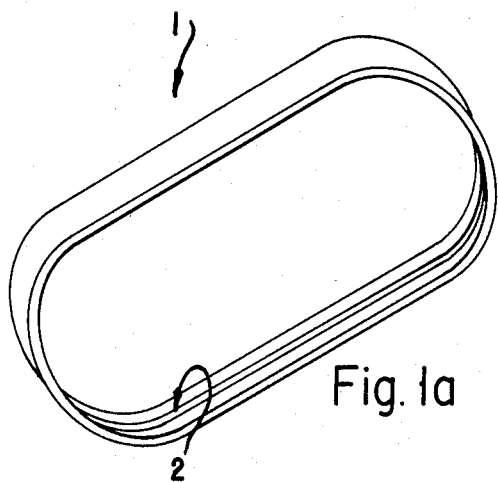
FIG. 1a is a perspective view of the belt according to the invention.
Figure 1B:
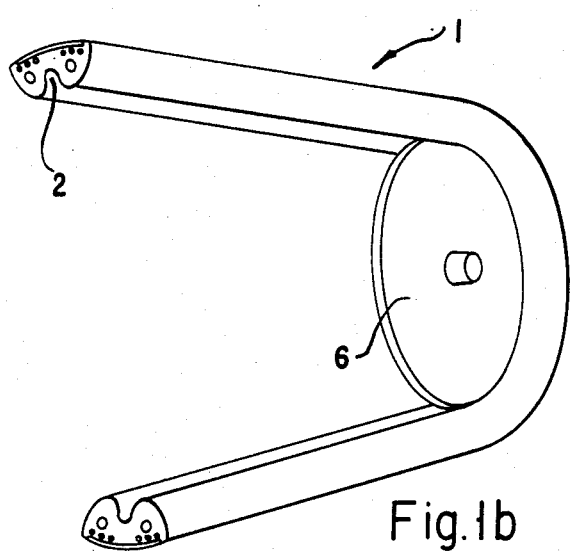
FIG. 1b is a partial perspective view of the belt and one pulley according to the invention.
Figure 2:
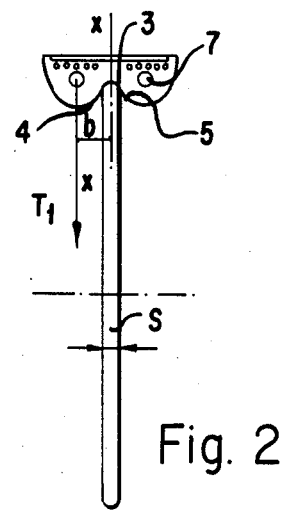
FIG. 2 is a cross-section of the belt shown in FIG. 1b and one of the pulleys constituting a part of the transmission.
Figure 4:
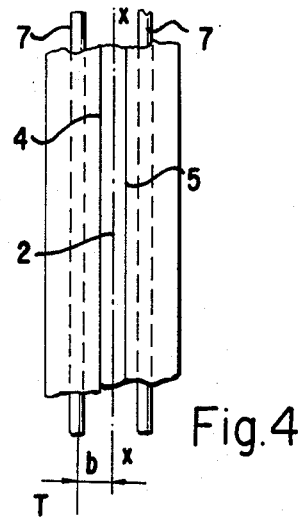
FIG. 4 is a bottom view of the belt of FIG. 2.

In FIG. 1, the reference numeral 1 indicates a driving belt made of a flexible polymeric material having the essential characteristic of being provided with a slot 2 delimited by a bottom 3 and lateral walls 4, 5 (see FIG. 2).

The flexible polymeric material forming the belt body is usually an elastomer of the type used in flexible driving belts. The polymeric material may, in particular, be a polyurethane or polycloroprene or other generally similar material as, for instance, neoprene or natural rubber and the like.

Figure 3A:
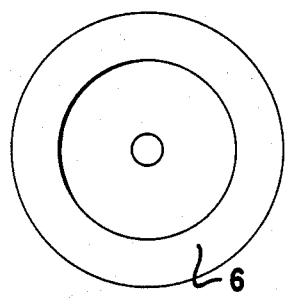
FIG. 3 is a front and a lateral view of one of the pulleys of the transmission.
Figure 3B:
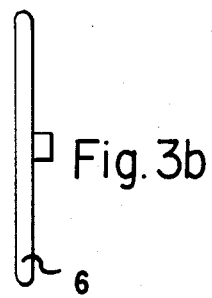

The belt 1 is a part of a system for the transmission of motion comprising at least two pulleys, a driving and a driven pulley, respectively, one of which is indicated by 6 in FIGS. 2 and 3.

As shown, the pulleys have a disc-like shape, i.e., they have a thinness adapted to be associated with the particular type of belt forming the invention.

The belt in rest condition, i.e., before embracing the pulleys, has transverse dimensions of the slot 2 greater than the thickness s of the disc; therefore, the belt is in contact with the disc only with the bottom 3 of the slot 2 and the lateral walls 4 and 5 are at a distance from the opposite lateral surfaces of the disc-shaped pulley.

The belt comprises a plurality of longitudinal inserts disposed on a ring concentric with the belt and oriented in the longitudinal direction of the belt.

For the sake of simplicity, in one embodiment relative to FIG. 2, only two longitudinal inserts in the form of cords 7 are shown.

The cords 7 are on one and the same plane and are at an average distance b from the central axis X—X passing through the center of the slot 2 (see FIG. 2).

In all the embodiments of the present invention, the longitudinal inserts may take the form of cords, threads, filaments of textile material, for instance of Kevlar or nylon, or they make take the form of thin metallic layers or mineral fibers, for instance glass fibers.

As shown in FIG. 1b, the belt comprises a particular zone at the slot that may be devoid of resistant elements; said zone will be called hereinafter a "hinged zone", having a function that will be more fully explained with reference to the remaining figures.

Figure 6A:
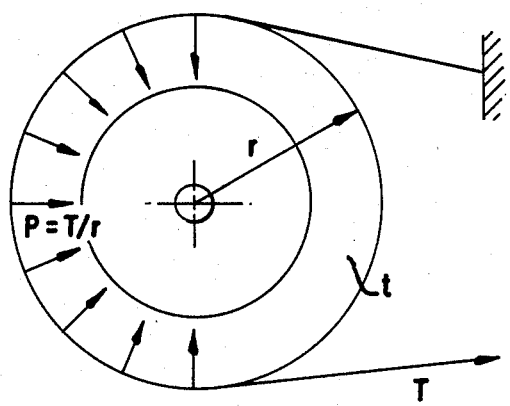
FIG. 6a shows the centripetal stresses transmitted by a rope subjected to a pulling action on a pulley.

In the transmission of motion, the belt 1 passing from the condition previous to its winding on the pulley to that of its winding on the pulley behaves substantially as the rope represented in FIG. 6a subjected to a pulling force T.

The rope embracing the pulley t statistically causes a stress condition p due to its pulling action, which is radially directed, and linked to the pull and to the radius of curvature r by the formula $T=p/r$.

Figure 5:
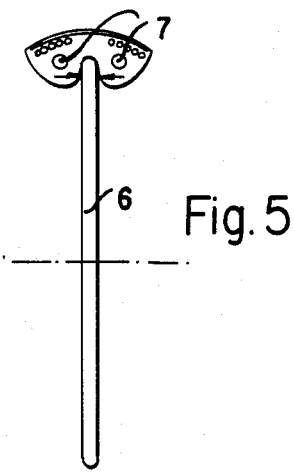
FIG. 5 shows the belt of FIG. 2 in gripping condition with its relative pulley.

Likewise, the belt 1 subjected to a pulling action T will give rise to a stress condition T1 (see FIG. 2) directed toward the center, with stresses disposed on a plane parallel to the central plane X—X of the disc. However, in this case, lacking the disc surface corresponding to the whole part of the belt lateral to the slot 2, the stress condition T1 on such parts of the belt adjacent the slot multiplied by the distance b will give rise to a torque around the hinged zone, with consequent rotation and approach of the lateral walls of the belt slot 2 to the opposite or adjacent lateral surfaces of the disc-like pulleys (see FIG. 5).

Consequently, the belt becomes engaged with the pulley and drags the pulley through friction.

The characteristics of the belt of the present invention are very different from those which are already known in conventional V-belts.

In fact, the conventional V-belt, during the wedging step between the pulley walls, is subjected to radial friction that opposes the wedging itself, and consequently brings about a power loss.

In the present invention, on the contrary, the belt does not suffer any type of opposition during the winding with the pulley, since it is not limited by the presence of the lateral walls of the V-pulley groove and can exercise all the torque produced by the pulling action to permit the slot walls to rest against the opposite faces of the disc-shaped pulley.

Therefore, in the arrangement according to the present invention there is no power loss. Moreover, in the belt according to the present invention, it is possible to adjust the lever mechanisms to extend or intensify the gripping action of the belt on the pulley.

Figure 6B:
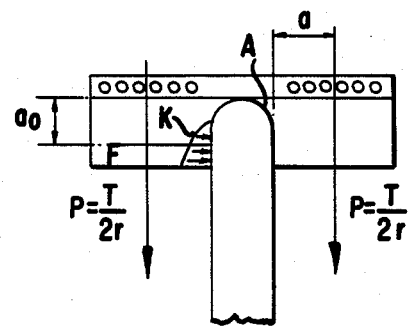
FIG. 6b shows the lever mechanism in the transmission of the invention.

This characteristic can be still better appreciated by making reference to FIG. 6b, in which:

$p=T/2r$ represents the centripetal force resulting from the pulling action;

r represents the radius of the disc;

a represents the distance of the centripetal force from the corner A of the hinged zone;

F represents the force resulting from the thrusts exercised on one face of the pulley;

K represents the possible curve that defines the intensity of the single thrusts;

$a_0$ represents the distance of the resulting force F from the bottom of the slot.

The working condition of the belt on the pulley is expressed by the equilibrium relation of the involved torques, i.e., by:

$$a \times p = F \times a_0,$$

from which it follows that $F/p = a/a_0$.

As shown in the previously-cited relationship (especially with reference to FIG. 6b), in the present invention it is possible to adjust the lever mechanism after a proper choice of the value so as to increase with equal pull action the value of the thrust F that brings about the gripping condition.

The belt 1, whose essential and working characteristics have already been illustrated and described, may include still further embodiments, as explained hereinafter.

Figure 7:
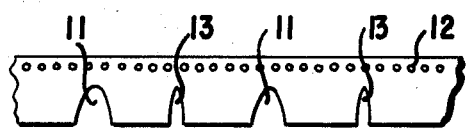
FIGS. 7 and 8 show, in section, a belt comprising a plurality of slots, each slot being similar to that shown in FIG. 2.
Figure 8:
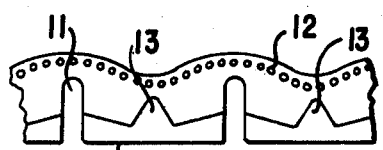

In one particular embodiment, the belt may comprise a plurality of slots 11 which are all parallel to one another (see FIGS. 7 and 8).

In this embodiment, the reinforcing structure 12 may be formed by a plurality of flexible and inextensible longitudinal elements, for instance in the form of cords, arranged on a plane overlying the slots.

The cords may be disposed also in the hinged zone, and moreover thin fabric layers may be associated with the cords over or under the plane of the cords, the whole selected so that the total resistance of the reinforcing pack does not impede the formation of hinged zones adapted to permit the approach between the lateral walls of the various slots during the winding of the belt around the pulleys of the transmission.

Preferably, the belt provided with a plurality of slots 11 may be characterized by the presence of particular means adapted to facilitate the engagement of the walls of the various slots on the corresponding lateral surfaces of the pulley.

In the particular embodiment of FIGS. 7 and 8, the means thus to facilitate the engagement may be represented by a plurality of cuts 13 extending longitudinally in the elastomeric material and alternating with the slots.

As clearly appears from FIG. 8, in the condition of torque transmission between the belt and the pulley, the presence of the cuts 13 permits a strong engagement of all the walls of the various slots 11 with disc-like radial protuberances which are all integrally disposed on a single hub in a pulley 15.

The embodiment represented in FIGS. 7 and 8 is particularly suitable when it is necessary to transmit great forces.

The belt according to the present invention is suitable to be wound on pulleys having relatively small radii of curvature. This favorable circumstance depends on the shape of the belt, which is substantially flat and therefore easily deformable on runs with great curvature.

Figure 9:
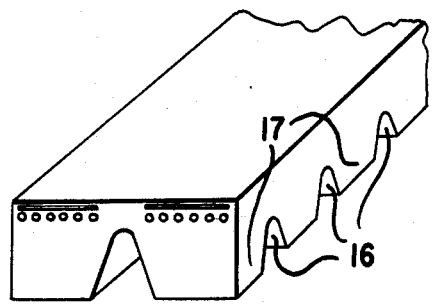
FIG. 9 is an embodiment of the belt provided with a cogged or toothed surface.

In particular, in those embodiments where it is required to transmit great forces the cross-section of the belt, although remaining substantially flat, may assume quite great areas, making recourse, where and if necessary, to a high longitudinal flexibility through the formation (FIG. 9) of a cogging or tooth-like configuration defined by spaces 16, alternating with teeth 17 arranged transversely with respect to the maximum extension of the belt.

Figure 10:
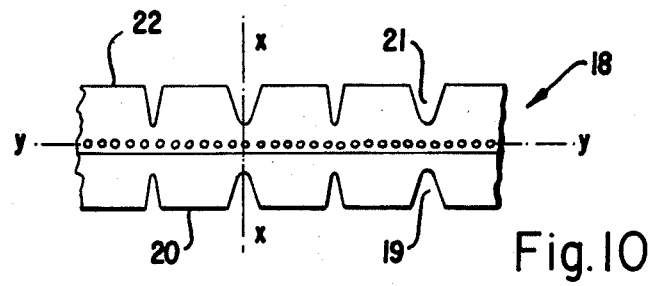
FIG. 10 is a cross-section of a belt having a plurality of slots on both sides.

FIG. 10 shows a belt 18 comprising all the characteristics cited up to now, with the further alternative of a characteristic adapted to make the belt completely suitable for working on both of its opposite faces. In fact, the belt 18 comprises a plurality of slots 19 having an opening on the side 20 and a plurality of opposite slots 21 on the other side 22 of the same belt.

Preferably, the belt 18 may be provided with parts that are symmetrical with respect to the central plane Y—Y crossing one-half of the belt body thickness.

In still another embodiment, said symmetry may be omitted and, for instance, the cogging of FIG. 10 facing one side may be offset with respect to that on the opposite side.

Also, the belt of the previous figures represented with symmetrical parts with respect to the vertical plane X—X passing through the center of the slot, as, for instance, indicated in the FIG. 10, may be embodiments devoid of said symmetry.

Figure 11:
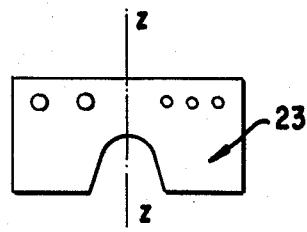
FIGS. 11 and 12 show some alternative embodiments comprising asymmetrical shapes of the belt with respect to the central plane defining the longitudinal slot.

For instance, in an alternative embodiment shown in FIG. 11, the belt 23 may comprise at the side of the plane Z—Z passing through the center of the slot a number of cords different from that relating to the opposite side, the total cross-section being the same.

Figure 12:
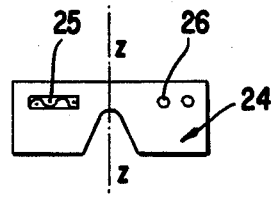

Also, for instance, as shown in FIG. 12, the belt 24 may comprise a resistant structure 25 with respect to the plane Z—Z passing through the center of the slot, said resistant structure being represented as a tape and being different from the resistant structure beyond the plane of symmetry defined by two cords 26.

Figure 13:
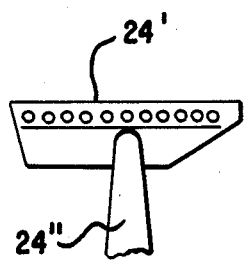
FIGS. 13 and 14 show some alternative embodiments of the invention.

Belts 24' where, in a cross-section with regard to the axis passing through the slot, the asymmetry has a shape such as that shown in FIG. 13 may also be provided.

The asymmetry may also be determined by parts similar in shape, but different in weight or density.

In the embodiment of FIG. 13, the disc 24" may have surfaces inclined about 5° with respect to the central plane. In such case, the walls of the slot are inclined, but form between them a greater angle by reason of having a transverse dimension greater than that of the disc.

Figure 14:
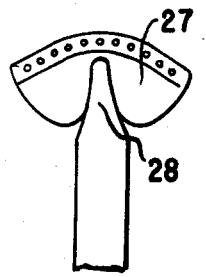

FIG. 14 represents a belt 27 acting on a disc 28 comprising opposite faces with a substantially curvilinear profile.

The present invention also comprises embodiments in which the profile of the pulley at its peripheral prt, with respect to the radial direction, has angles of inclination or profiles more complicated and more suitable to wedge themselves into the slot of the belt.

In all the cited solutions, the slot of the belt may have various geometrical shapes.

Figure 15:
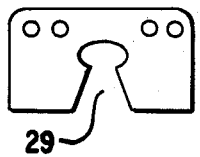
FIGS. 15 and 16 show, in cross-section, some embodiments of the slot.
Figure 16:
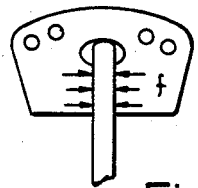

The embodiment of FIGS. 15 and 16 shows a belt in which the space 29, in a cross-section relative to the belt, has a first innermost portion having an enlarged shape and a subsequent outermost portion having a shape diverging in linear fashion from the walls.

The tightening effect in the embodiment of FIG. 15 is better represented in FIG. 16 by small arrows f.

The embodiment of FIGS. 15 and 16, as in the previous embodiments, stress the feature of providing proper means adapted to increase the friction between the belt and the surface of the pulleys.

In another embodiment according to the present invention, the transmission may be characterized, for instance, by pulleys having disc-like radial protuberances of metallic material and a belt with very-short-length particles or fibers dispersed in the elastomeric material in the form of fibers oriented in any direction whatsoever on condition that they come out with one end between the slot walls of the belt. In particular, in one preferred embodiment, the means adapted to increase the friction may be formed by fibers directed in a transverse direction. These fibers may be made of aramide resins or by other materials, such as nylon, polyester or rayon. The fibers may have lengths between 0.5 mm and 5 mm and a diameter between 10 microns and 400 microns.

As an alternative to the previous embodiment, one may have recourse to an arrangement in which the disc-like lateral surfaces of the pulleys may be formed of metallic surfaces covered with materials having a high coefficient of friction.

In other embodiments, the pulleys may be obtained by sheet shearings (i.e., sheets of metal suitably cut for constituting the pulley) and, in still other embodiments, by a molding operation with polyamide resins added having very-short-length particles or fibers adapted to bring about a high coefficient of friction.

This invention achieves all the desired objectives. In fact, as the belt has a thin shape, it brings about a flexibility which is comparable with that of flat belts, although based on a completely different working principle.

However, the present belt, in comparison to flat belts, eliminates excessive sliding phenomena, and this is due to the fact that the engaging effect of the walls of the slots of the present belt is comparable to real mechanical jaws which tighten on the corresponding parts of the disc-like pulleys and provided with lever mechanisms that may be adjusted from time to time.

Moreover, the belt according to the invention avoids all those pulling and wedging phenomena, with consequent loss of power, that are common to the V-belts.

In fact, the engagement between the belt and the pulley takes place in consequence of the action of the lateral walls of the belt, on the opposite faces of the pulleys that remain internal to the belt, and the closing of the slot takes place when the belt is already curved about the pulley and not before.

In substance, in the belt of the present invention, all the drawbacks deriving from the need of transversely stiffening the conventional V-belt are avoided, together with the consequent drawback of the conventional V-belt deriving from the fact that an excessive transverse stiffening of the V-belt may bring about such a longitudinal stiffening of the belt as to make it not well adapted to pulleys with a small radius of curvature.

A particularly desirable aspect of the present invention is that the transmission of motion through friction is determined by the contact between the walls of the slots provided in the belt and the opposite or adjacent surfaces of the pulleys.

The result of this type of working is the disc-like construction of the pulleys, as indicated above, i.e., a thin construction that is a structure of very light weight.

Therefore, the present transmission, being formed by belts and pulleys whose masses are substantially lighter, permits one to move the resonance frequency of the system to higher values out of the normal values.

The adaptability of the whole transmission to all those applications in which utmost noiselessness is required, that is in the mechanical precision systems, in the automobile industry, and in various industrial applications, follows from the cited lightness characteristic.

Although some particular embodiments of the present invention have been illustrated and described, it is to be understood that the present invention includes within its scope alternative embodiments accessible to a technician in the field, for instance, the invention is directed to belts in which the inextensible longitudinal elements may assume both the shape of cords, threads, filaments, i.e., continuous elongated bodies, and discontinuous configurations, as may be obtained, for instance, by using a plurality of fibers whose disposition is mainly oriented according to longitudinal direction with respect to the belt body so as to absorb the pulling action necessary to the transmission of motion.

Also, this invention includes belts whose body is constituted in general by a flexible polymeric material, this term being intended to mean natural rubber, synthetic rubber and compounds of these latter, as is well known to technicians in the art.

The present invention also includes all those belts in which the longitudinal edges, instead of being square as shown in the figures, assume different configurations with cuts or lightening spaces in the elastomeric material to make the belt lighter and to run devoid of noise, as well as the different shapes that it may be considered advisable to give to the outer profile of the discs, as single angles of inclination, areas of a circle, parabolas, and the like.

The pulley may also comprise on the opposite faces irregularities in the form of projections alternating with grooves arranged so as to permit a localized deformation of the elastomeric material of the walls of the belt slot. This permits one to improve still further the gripping action between the belt and the pulleys, which is thus entrusted not only to the friction, but also to an engagement mechanism.

The present invention also includes embodiments in which the belt is provided with the slot as described, the smaller diameter pulley is provided with a disc-like protuberance for engaging with the slot walls, and the second greater diameter pulley is provided with a smooth cylindrical outer surface.

What is claimed is:

1. A belt made substantially of a flexible polymeric material for the transmission of motion with at least two pulleys, each of said pulleys having two opposed lateral surfaces, said belt comprising a plurality of resistant inserts disposed on a ring concentric with the belt oriented according to the longitudinal direction of the belt, said belt being characterized in comprising at least one longitudinal slot according to the direction of maximum development of the belt delimited by a bottom and by two lateral walls and a hinged zone in correspondence with the slot, during a rest condition said slot having a transverse dimension greater than the thickness of said pulleys between said opposed lateral surfaces, whereby the pulling action exercised on the inextensible elements leads to the approach of the lateral walls of said slot to the adjacent lateral surfaces of the pulleys with the resulting transmission of motion through friction.

2. A belt as defined in claim 1, characterized in that said inextensible elements are embedded in one plane of the flexible polymeric material of the belt and arranged only in lateral position with respect to the slot.

3. A belt as defined in claim 1 or 2, characterized in comprising a plurality of parallel longitudinal slots.

4. A belt as defined in claim 3, characterized in comprising in a position alternating with respect to the slots means to facilitate the engagement of the walls of the slots with the adjacent lateral surfaces of the pulleys.

5. A belt as defined in claim 1 or 2, characterized in comprising on at least one of the furthermost surfaces of the belt a transverse cogging with respect to the belt direction.

6. A belt as defined in claim 1 or 2, characterized in comprising on the walls of the slots means for improving the engagement with the surfaces of the pulleys.

7. A system for the transmission of motion between a belt made of a flexible polymeric material and at least two pulleys, a driving and a driven pulley respectively, each pulley having two opposed lateral surfaces, said belt comprising a plurality of inextensible elements parallel to one another on a ring concentric with the belt and oriented according to the longitudinal direction of the belt, said transmission being characterized in that said belt comprises at least a longitudinal slot delimited by a bottom and two lateral walls and a hinged zone at the slot, each one of said pulleys comprising at least one disc-like protuberance upon which lies the outermost part of the bottom of the belt slot, said transmission of motion passing from a position in which the two lateral walls of the belt slot are at a distance from the adjacent lateral surfaces of the disc-like protuberances of the pulleys to subsequent working positions during the winding of the belt on the pulleys, whereby the pulling action exercised on the inextensible elements of the belt determines the approach to, and the engagement of, said lateral walls of the slot with the adjacent lateral surfaces of the disc-like protuberances with transmission of motion between the belt and the pulleys through friction.

8. A system for the transmission of motion as defined in claim 7, characterized in that said two pulleys are two discs.

9. A system for the transmission of motion as defined in claim 7, characterized in that each pulley is formed by a plurality of discs integrally arranged with respect to one another on a single hub put into movement by a plurality of slots of a single belt when the walls of the said slots act in co-operation with the adjacent lateral surfaces of the discs.

10. A system for the transmission of motion as defined in claim 7, characterized in that the profile of the pulleys at their peripheral part has angles of inclination with respect to the radial direction, adapted to improve the wedging action of the belt slot.

* * * * *